United States Patent
Santos et al.

(10) Patent No.: US 8,326,925 B2
(45) Date of Patent: Dec. 4, 2012

(54) CONNECTING TO EXPERTS IN A DISCUSSION BOARD

(75) Inventors: Richard A. Santos, Roseville, CA (US);
Paul A. Meyers, Granite Bay, CA (US);
Ashish Pisolkar, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2592 days.

(21) Appl. No.: 11/047,254

(22) Filed: Jan. 31, 2005

(65) Prior Publication Data

US 2006/0174340 A1  Aug. 3, 2006

(51) Int. Cl.
*G06F 15/16* (2006.01)
(52) U.S. Cl. ........ 709/204; 715/758; 715/705; 715/714; 709/223
(58) Field of Classification Search .................. 709/204; 715/789; 706/50; 707/104
See application file for complete search history.

(56) References Cited

U.S. PATENT DOCUMENTS

| | | | | |
|---|---|---|---|---|
| 5,107,499 A | * | 4/1992 | Lirov et al. | 714/26 |
| 6,062,862 A | * | 5/2000 | Koskinen | 434/107 |
| 6,393,412 B1 | * | 5/2002 | Deep | 705/400 |
| 6,505,166 B1 | * | 1/2003 | Stephanou | 705/8 |
| 6,513,013 B1 | * | 1/2003 | Stephanou | 705/9 |
| 6,901,394 B2 | * | 5/2005 | Chauhan et al. | 706/60 |
| 6,973,620 B2 | * | 12/2005 | Gusler et al. | 715/708 |
| 6,976,067 B2 | * | 12/2005 | Gusler et al. | 709/223 |
| 7,043,698 B2 | * | 5/2006 | Newbold | 715/789 |
| 7,340,442 B2 | * | 3/2008 | Jeanblanc et al. | 706/46 |
| 7,568,001 B2 | * | 7/2009 | McPartlan et al. | 709/202 |
| 2002/0059088 A1 | * | 5/2002 | Whalen et al. | 705/8 |
| 2004/0172415 A1 | * | 9/2004 | Messina et al. | 707/104.1 |
| 2006/0047615 A1 | * | 3/2006 | Ravin et al. | 706/50 |
| 2007/0226628 A1 | * | 9/2007 | Schlack | 715/733 |
| 2008/0104517 A1 | * | 5/2008 | Horvitz | 715/733 |

* cited by examiner

*Primary Examiner* — Greg C Bengzon

(57) ABSTRACT

One embodiment of the invention relates to a method for processing a post to a discussion board comprising placing the post on the discussion board; performing an entitlement check to determine whether access to an expert should be provided to the user, wherein the entitlement check is associated with at least one of a characteristic of the user and a characteristic of the post; and based on the entitlement check providing access to the expert in the form of a control.

21 Claims, 4 Drawing Sheets

CONNECTING TO EXPERTS IN A DISCUSSION BOARD

DESCRIPTION OF THE RELATED ART

A discussion board (known also by various other names such as discussion group, discussion forum, newsgroup, bulletin board service (BBS), online discussion board, message board, and online forum) is a general term for any online "bulletin board" where users can leave messages or questions and expect to see responses to the messages or questions. Alternatively, users can just read the board without posting a message. A community refers to the users, experts, etc. that read and/or place postings on the discussion board. Posts or postings are messages, comments, questions, queries, answers, responses, announcements, etc.

In discussion boards, an individual seeking information may navigate to a particular topic area within the discussion board to place a post relative to the specific topic area. Other users of the discussion board may navigate to the same topic area, read the post, decide they are able to help the individual, and place a reply to the post. Discussion boards may also have moderators or experts that participate in the discussion board. The moderators typically monitor the questions for appropriateness and, sometimes, reply to questions as well.

The first discussion boards were available on dedicated bulletin board systems. On the Internet, Usenet provides thousands of discussion boards. These can now sometimes be viewed from a Web browser. Today, many websites offer a discussion board so that users can share and discuss information and opinions.

Some discussion boards allow a user to submit a question directly to a moderator, or conduct web collaboration, where information can be shared directly between the user and the moderator, e.g. sharing screens. Other discussion boards allow a user to directly call a moderator and discuss a problem, while also communicating via their computers.

DETAILED DESCRIPTION OF THE INVENTION

Aspects of the invention involve seamless integration of different types of user interaction with a discussion board. The discussion board has certain thresholds or trigger points that escalates the types of communication offered to a user. The discussion board is able to dynamically modify the interface to present the user with different communication types based on the thresholds. The threshold acts to filter the high volume of users in the discussion board and route their requests to an appropriate expert. For example, the user may be provided with an additional button or feature, which when selected, allows a user to be connected to a moderator or expert. This allows for real-time communication with an expert, rather then waiting for an expert to place or mail a response to a posting. A threshold may be based on a level of service purchased by the user or awarded to a user.

Figure 1:
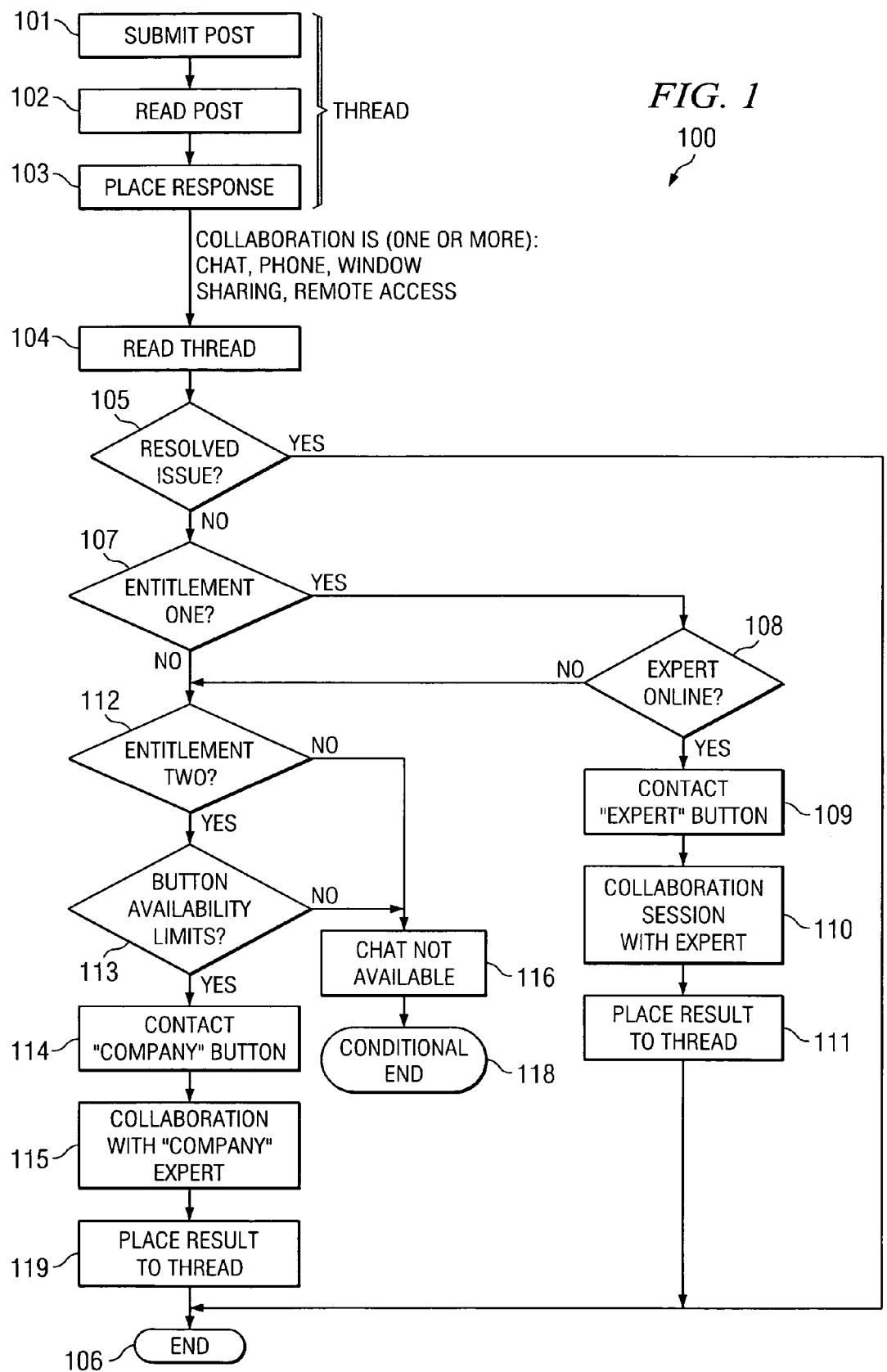
FIG. 1 depicts an example of a flow chart according to embodiments of the invention.
Figure 2:
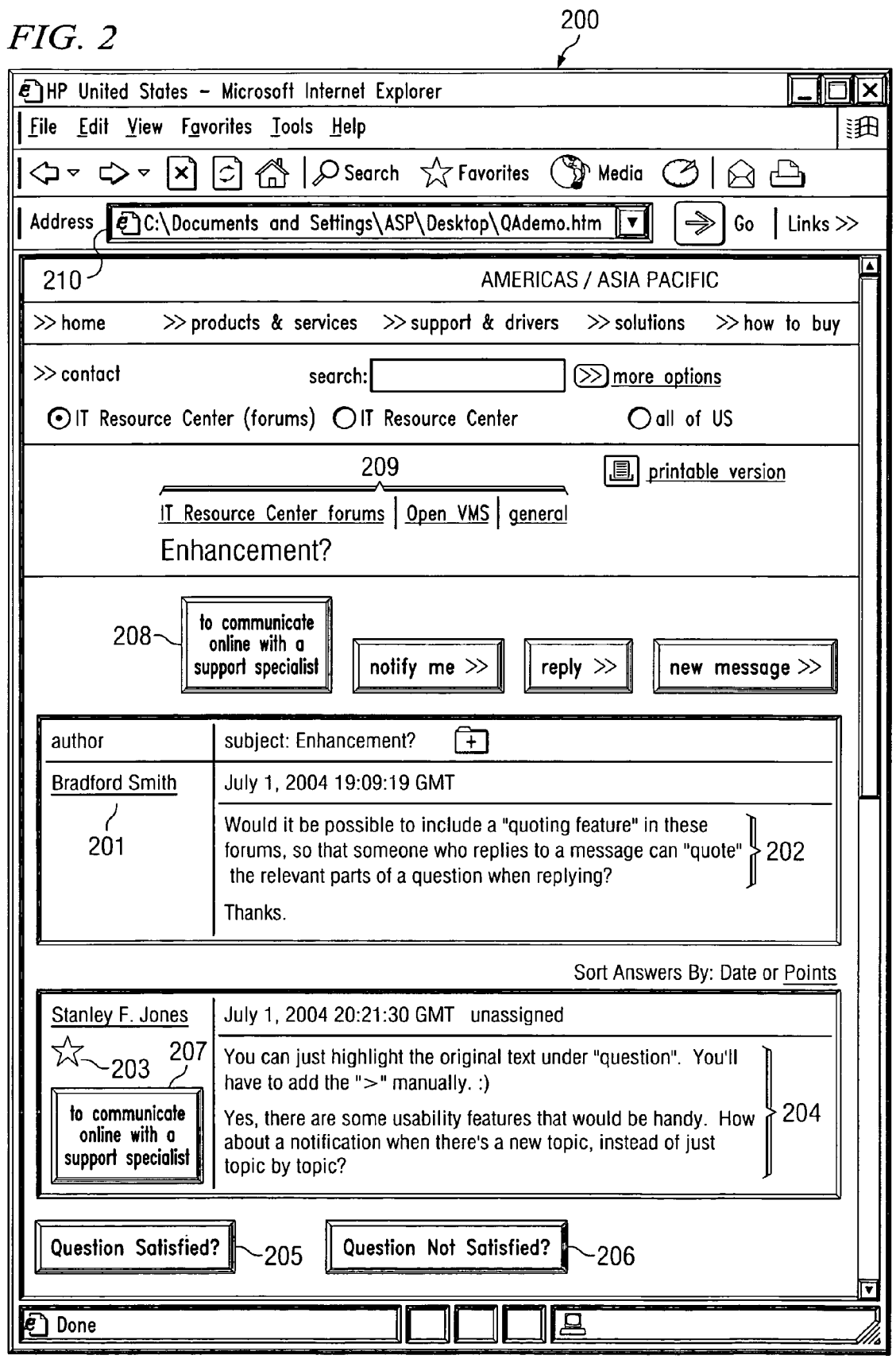
FIG. 2 depicts an example of a graphical user interface according to embodiments of the invention.

FIG. 1 depicts an example of a flow chart 100 depicting interactions between a community and a user or a discussion board, according to embodiments of the invention. FIG. 2 depicts an example of a graphical user interface (GUI) 200 displaying portions of a thread of a discussion board 210 according to embodiments of the invention. The GUI 200 may be presented to a user during the interactions. Note that the actual appearance of the GUI 200 is by way of example only, as the user interface may take on many different forms.

Referring to both FIGS. 1 and 2, the interaction starts when a user submits a posting to the community of a discussion board 210, as indicated in operation 101. For example, user 201 submits a post, such as question 202 to a specific topic area 209 of the discussion board 210. Typically, another user or expert reads the post, as indicated in operation 102, and places a response that is threaded with the post, as indicated in operation 103. For example, expert 203 may post answer 204 to question 202. Note that an expert may not have read the post, and a response may not have been posted.

At operation 104, user 201 may read the posted response or responses, if any. User 201 may then determine whether the response satisfied the post or resolved the issue associated with the post, as indicated at operation 105. If the response includes a procedure that the user needs to perform to resolve the issue, then at this point the user may perform the procedure to verify the solution offered. The users of the discussion board 210 may consider the question satisfied, unless the user 201 resubmits the question, or provides a comment that the question has not been satisfactorily answered. Alternatively, the discussion board 210 may provide the user with feedback buttons 205, 206, which allow the user 201 to provide an indication to the discussion board 210 whether the issue of the post has been resolved to the user's satisfaction. As another alternative, the discussion board 210 may provide a grade block that allows the user 201 to grade the appropriateness of the response, e.g. "A" for a perfect answer and "E" for a useless answer. Note that the grade may be a number, e.g. "10" for a perfect answer and "0" for a useless answer. The discussion board 210 may track the number of times that the question has been asked by different users. If a similar response has worked for a predetermined number of users, then the question and response may be added to a frequently-asked-questions (FAQ) list.

If the issue has been satisfactorily resolved, then the interaction terminates as shown by branching to end point 106. If the posted response(s) does not satisfy the issue, then the interaction continues to operation 107. Also, the interaction may be allowed to continue to operation 107 if a predetermined amount of time has passed since the question has been submitted, and an expert has not read the post and/or an expert has not posted a response.

At operation 107, the discussion board 210 performs a first entitlement check to determine whether the user is entitled to receive any additional service(s) from the discussion board 210. Entitlement may be based on user characteristics, post characteristics, or a combination of both. User characteristics may involve a user profile that is maintained by the discussion board 210 for each user that defines what service(s) the user is entitled to receive. For example, a user may purchase a 'gold' level of service, and be entitled to have a particular feature(s) and/or the user may be granted a level of service via a warranty or other contract. Alternatively, the profile may include an entitlement account, wherein a user accumulates points by buying points or earning points through participation in the discussion board 200 (e.g. placing posts, responding to posts, providing comments, etc.). Points may be deducted from a user's account each time a user asks for assistance. Having a certain number of points allows the user to access an additional service(s). Other examples of user characteristics include the role of the user in the discussion board 210. For example, in ascending order, whether the user is a general non-registered user, a general registered user, an expert in a particular area, an assigned moderator, or an expert. The greater the role of the user, the more weight (e.g. points) is given in deciding to grant access. Other considerations may include whether the user has asked for assistance, such that a frequently user of expert time may have access to an expert restricted. Note that one or more of these considerations may be used in the entitlement check.

Post characteristics may involve the length of time a post has been on the discussion board 210 (e.g. without response or without a satisfactory response). Other post characteristics may include the number of other users placing the same or similar posts (e.g. a common problem), such that the more users with the same post, the more likely access to the expert will be granted. Further post characteristics may include points assigned to the responses associated with the post (e.g. a satisfactory response or not). For example, if a response was rated 8, 9, or 10 (on a range of 1-10) by the user, then this is assumed to be a satisfactory answer to the post, and thus further collaboration is not needed on this post, which eliminates entitlement for further services. Another post characteristic may be whether an expert has already been assigned to the post, and the hours of operation for the experts. Note that one or more of these considerations may be used in the entitlement check.

If the user is allowed to access the additional service, the discussion board 210 displays a button or box (207 of FIG. 2) to the user via the user's GUI 200. Essentially, the button or box is hidden until entitlement checks are satisfied. Depending on the type of service, an additional check may be needed to determine if the service is currently available to the user. For example, as shown in FIG. 1, operation 107 checks to see if user 201 can have a real-time, on-line session with expert 203 that answered the question. Before the "contact expert" button (207 of FIG. 2) is displayed to the user, the discussion board 210 checks to see if the expert is on-line, as indicated at operation 108. If the expert is not on-line or is otherwise unavailable (e.g. the expert is already involved in another collaboration), then the button is not displayed. If the expert is on-line, then the button is displayed to user, as indicated at operation 109.

The user may then decide to initiate a collaboration session with the expert, by pushing or selecting the "contact expert" button as indicated in operation 110. A collaboration is a real-time session between the user and the expert which may involve one or more of a computer chat session, a teleconference (by computer and/or by a telephone line), a window sharing session, or a remote access session where the expert takes control of the user's computer. A window sharing session is where the questioner shares what they see on their monitor (LCD or CRT) with the responder on their monitor (LCD or CRT) or visa versa. This allows the two to collaborate visually, as well as auditory (e.g. over the phone). This button is suitable for the situation where the user is confused or otherwise needs clarification for the response provided by the expert.

After the collaboration, either the user and/or the expert may optionally post the result of the collaboration to the post thread, as indicated in operation 111. The discussion board 210 may also optionally maintain a copy of the script of the collaboration and post the script to the post thread. The collaboration should have satisfied the question, so the interaction ends at operation 106.

As shown in FIG. 1, if the answer to either of operation 107 or 108 is "no," then the discussion board 210 performs a second entitlement check as indicated at operation 112. Entitlement may be based on user characteristics, post characteristics, or a combination of both. Note that the second entitlement check may be similar to the first entitlement check. For example, both checks may involve a time of posting, however, the second check may have a lesser post time than the first check if a certain level of service has been purchased by the user. Alternatively, the second entitlement check may be different from the first entitlement check. This entitlement check may be based on a level of service or an entitlement account. The level or account values may be similar to that of the first entitlement check or they may be different, e.g. lower or higher. The first entitlement check may be based on a level of service, while the second entitlement check is based on an account, or vice-versa. For example, as shown in FIG. 1, operation 112 checks to see if the user can have a real-time, on-line session with an expert, not necessarily the expert 203 that answered the question. This expert may be a general expert, or may be an expert assigned, such as an "Expert," assigned from a pool of experts. The combination of the first and second entitlement checks allows the discussion board to provide access to assistance based on different considerations. For example, the first entitlement check may determine whether a user is granted access to an expert based on the level of service purchased by the user, while the second entitlement check is based upon the length of time of the post has been on the discussion board without a response. Thus, a post made by a user may be addressed by an expert if the post has been not been responded to within a predetermined amount of time.

If the user is not entitled to this service, then additional services are not available, 116, and the interaction conditionally ends, 118. A conditional ending means that the post thread is not complete, and another response may be later posted which satisfies the post, but the discussion board 210 is not offering any other services for the post at the current moment.

If the user satisfied the requirements of the second entitlement check, 112, the interaction branches to operation 113 to determine whether real time services with an expert are available. Before the "contact company" button (208 of FIG. 2) is displayed to the user, the discussion board 200 checks to see if the button should be made available to the user, 113. For example, the pool of experts may only be available during certain time periods, then the "contact company" button is not provided to the user outside of the certain time periods. As another example, the "contact company" button may not be provided to the user until a certain time period (e.g. three hours) has passed since the post 202 has been posted. This allows time for the discussion board specific experts to review and respond to the question. If the button should not be made available, then the service is not available, 116, the button is not displayed, and the interaction conditionally ends, 118. If the button real time service are available, then the button 208 is displayed to user, as indicated in operation 114.

The user may then decide to initiate a collaboration session with the expert by pushing or selecting the "contact company" button, as indicated at operation 115. A collaboration is a real-time session between the user and the expert which may involve one or more of a computer chat session, a teleconference (either by computer or by a telephone line), a window sharing session, or a remote access session where the expert takes control of the user's computer. This button 208 is suitable for the situation where the post has not been responded to and/or the responses are incorrect, not applicable, or otherwise unusable by the user.

After the collaboration, either the user and/or the expert may optionally post the result of the collaboration to the post thread, as indicated at operation 119. The discussion board may also optionally maintain a copy of the script of the collaboration and post the script to the post thread. The collaboration should have satisfied the post, so the interaction ends at point 106.

Note that although FIG. 2 only depicts one answer, the thread may contain multiple answers, one or more comments, as well as other questions, e.g. sub-questions.

Figure 3A:
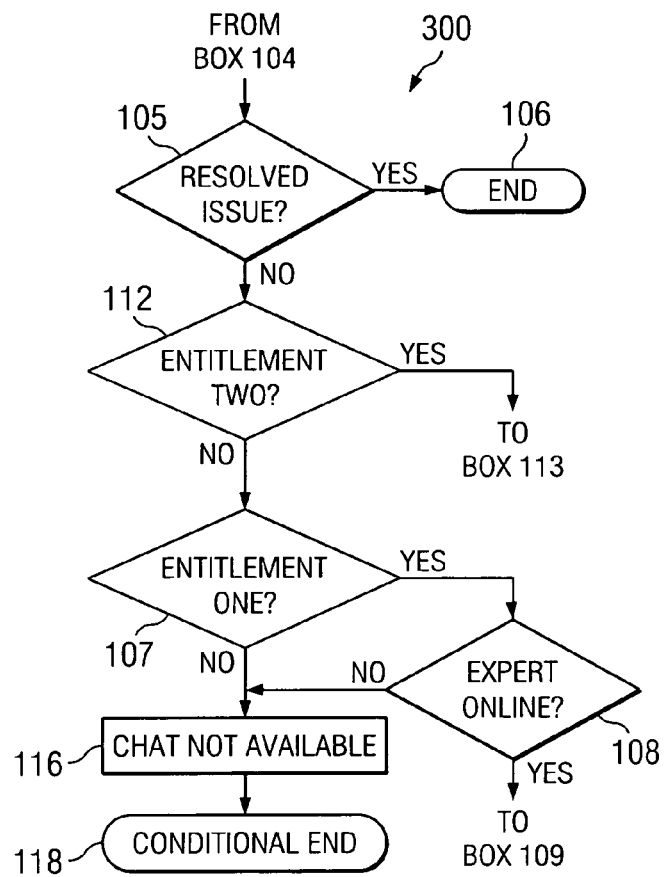
FIGS. 3A and 3B depict alternative examples to the interaction of FIG. 1, according to embodiments of the invention.
Figure 3B:
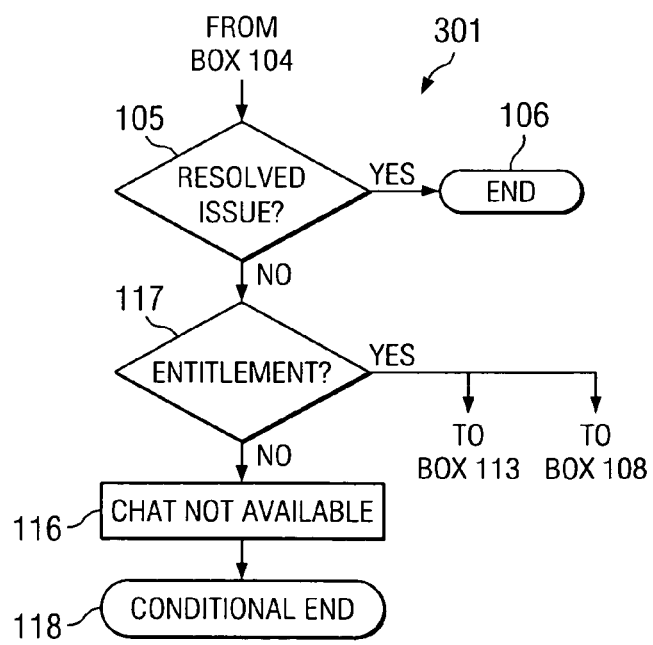

FIGS. 3A and 3B depict alternative arrangements for the interaction of FIG. 1. In FIG. 3A, the flow of the interaction 300 checks entitlement 2 (112) before checking entitlement 1 (107). Otherwise the flow is similar to that of FIG. 1. In FIG. 3B, the flow of the interaction 301 has only 1 entitlement check, 117, checking for both the "contact expert" button and the "contact company" button. At operation 117, the discussion board 210 determines whether the user is entitled to receive an additional service(s) from the discussion board. For example, the discussion board may make a check similar to that of operation 107 or 112. Also, note that FIG. 1 depicts two entitlement checks, but the flow may have more than two entitlement checks.

Further note that the user may be operating a computer that is distant from a computer or server that is associated with the discussion board 210 and a network, e.g. the Internet may connect the user's computer to the discussion board computer. Furthermore, any of the experts may be located near the discussion board server (e.g. onsite) or may be located distant from the discussion board server, and may be connected to the discussion board server by a network, e.g. an intranet or the Internet.

Note that any of the functions described herein may be implemented in hardware, software, and/or firmware, and/or any combination thereof. The functions described herein may reside on one or more computers associated with one or more of the users of the discussion board, the expert(s), or an associated computer. When implemented in software, the elements of the present invention are essentially the code segments to perform the necessary tasks. The program or code segments can be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

Figure 4:
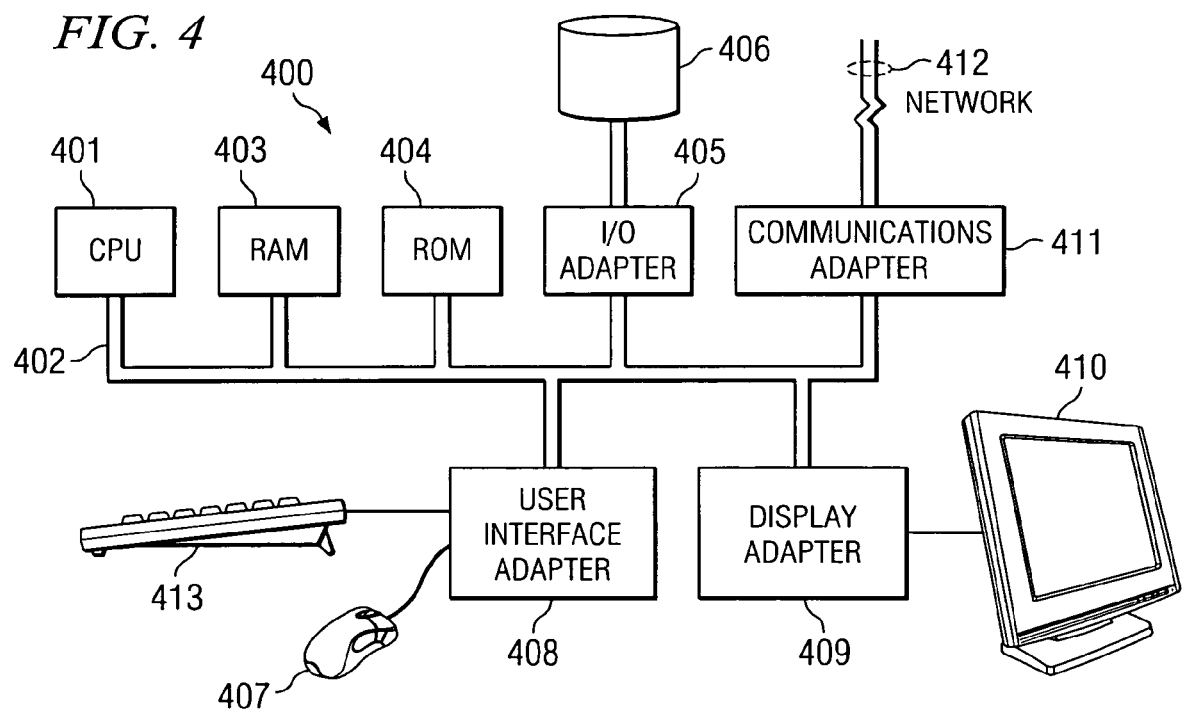
FIG. 4 depicts a block diagram of a computer system which is adapted to use the present invention.

Aspects of the invention may reside on a computer system, e.g. a personal computer system or a service system. FIG. 4 illustrates computer system 400 adapted to use the present invention. Central processing unit (CPU) 401 is coupled to system bus 402. The CPU 401 may be any general purpose CPU, such as an INTEL PENTIUM processor. However, the present invention is not restricted by the architecture of CPU 401 as long as CPU 401 supports the inventive operations as described herein. Bus 402 is coupled to random access memory (RAM) 403, which may be SRAM, DRAM, or SDRAM, etc. ROM 404 is also coupled to bus 402, which may be PROM, EPROM, or EEPROM. RAM 403 and ROM 404 hold user and system data and programs as is well known in the art.

Bus 402 is also coupled to input/output (I/O) controller card 405, communications adapter card 411, user interface card 408, and display card 409. The I/O adapter card 405 connects to storage devices 406, such as one or more of a hard drive, a CD drive, a floppy disk drive, or a tape drive to the computer system. The I/O adapter 405 may also be connected to a printer, which allows the system to print paper copies of information such as document, photographs, articles, etc. Note that the printer may be a printer (e.g. dot matrix, laser, etc.), a fax machine, or a copier machine. Communications card 411 is adapted to couple the computer system 400 to a network 412, which may be one or more of a telephone network, a local (LAN) and/or a wide-area (WAN) network, an Ethernet network, and/or the Internet network. User interface card 408 couples user input devices, such as keyboard 413, pointing device 407, and microphone 416, to the computer system 400. User interface card 408 also provides sound output to a user via speaker(s) 415. The display card 409 is driven by CPU 401 to control the display on display device 410.

What is claimed is:

1. A method for processing a post to a discussion board comprising:
   placing the post on the discussion board from a user;
   performing an entitlement check to determine whether access to an expert should be provided to the user, wherein the entitlement check is associated with at least one of a characteristic of the user and a characteristic of the post; and
   based on the entitlement check providing access to the expert in the form of a graphical control.

2. The method of claim 1, further comprising:
   placing a response to the post from the expert.

3. The method of claim 1, further comprising;
   performing an availability check to determine whether to perform the providing if the user is entitled to access to the expert.

4. The method of claim 1, further comprising:
   selecting the control, by the user, thereby initiating access to the expert; and
   collaborating between the user and the expert regarding the post.

5. The method of claim 4, wherein the collaborating comprises:
   cooperating, between the user and the expert, in a real time session involving at least one of: a computer chat session, a teleconference, a window sharing session, or a remote access session.

6. The method of claim 4, further comprising:
   placing a result of the collaboration on the discussion board.

7. The method of claim 1, further comprising:
   purchasing, by the user, a desired level of entitlement;
   wherein the performing determines whether the desired level is sufficient to provide the access to the expert.

8. The method of claim 1, wherein the user and the expert are members of a community which is associated with the discussion board, and the method further comprises:
   earning, by the user, a desired level of entitlement through participation in the discussion board;
   wherein the performing determines whether the desired level is sufficient to provide the access to the expert.

9. The method of claim 1, further comprising:
placing a response to the post on the discussion board by an expert;
wherein placing the response occurs prior to the performing, and the response does not satisfy the query of the user.

10. The method of claim 9, further comprising:
providing the user with a feedback interface to provide an indication of their satisfaction of the response responding to the query.

11. The method of claim 1, further comprising:
performing another entitlement check to determine whether access the expert should be provided to the user, wherein the another entitlement check is associated with at least one of a characteristic of the user and a characteristic of the post.

12. The method of claim 11, wherein the performing another entitlement check is operative if the expert is not available.

13. The method of claim 11, wherein the performing another entitlement check is operative if the user is not entitled to access to the expert.

14. The method of claim 1, wherein the performing comprises:
determining whether the user has a desired entitlement level that is sufficient to provide the access to the expert.

15. The method of claim 14, wherein the entitlement level is based on at least one of a warrantee possessed by the user, points accumulated by the user, points earned by the user, points purchased by the user, a level of service purchased by the user, role of the user in the electronic bulletin board, a length of time the query has been posted, and availability of an expert.

16. The method of claim 1, wherein the control is a graphical control.

17. The method of claim 1, comprising:
prior to placing the post, concealing the control to deny the user access to the expert.

18. The method of claim 1, wherein the providing comprises:
providing an interface to a GUI of the user to initiate access with the expert.

19. A computer system for processing an information query of a user that has been posted on a discussion board, the computer system including software stored on a computer readable storage device and performing a method comprising:
providing a graphical user interface (GUI) to the user;
performing an entitlement check to determine whether access to an expert should be provided to the user, wherein the entitlement check is associated with at least one of a characteristic of the user and a characteristic of the query;
modifying the GUI to include a feature to allow access with the expert based on the entitlement check.

20. The computer system of claim 19, further comprising:
facilitating a collaboration between the user and the expert regarding the query.

21. The computer system of claim 19, wherein the performing comprises:
determining whether the user has a desired entitlement level that is sufficient to provide the access to the expert based on at least one of a warrantee possessed by the user, points accumulated by the user, points earned by the user, points purchased by the user, a level of service purchased by the user, role of the user in the electronic bulletin board, a length of time the query has been posted, and availability of an expert.

* * * * *

UNITED STATES PATENT AND TRADEMARK OFFICE
CERTIFICATE OF CORRECTION

PATENT NO. : 8,326,925 B2  
APPLICATION NO. : 11/047254  
DATED : December 4, 2012  
INVENTOR(S) : Richard A. Santos et al.

Page 1 of 1

It is certified that error appears in the above-identified patent and that said Letters Patent is hereby corrected as shown below:

In column 7, line 13, in Claim 11, delete "access the" and insert -- access to the --, therefor.

Signed and Sealed this  
Twelfth Day of March, 2013

Teresa Stanek Rea  
*Acting Director of the United States Patent and Trademark Office*